United States Patent Office 3,036,631
Patented May 29, 1962

3,036,631
WATER-FLOODING PROCESS
Orrin C. Holbrook, Crystal Lake, Ill., assignor to The Pure Oil Company, Chicago, Ill., a corporation of Ohio
No Drawing. Filed Feb. 19, 1959, Ser. No. 794,244
4 Claims. (Cl. 166—9)

This invention relates to an improved process for recovering petroleum oil from underground reservoirs. More specifically, this invention deals with a method of producing surfactants in the reservoir by oxidation of a portion of the oil content thereof, and producing oil from said reservoir by means of a caustic water-flood.

It is well known that the presence of surfactants at an oil-water interface reduces the surface tension at the interface with the result that a greater portion of the oil present in the reservoir can be produced by a water-flood. It has been found that surfactants can be produced in the oil in the reservoir by partially oxidizing a portion of the oil. This can be accomplished by the injection, under pressure, of an oxygen-containing gas into the reservoir. While the surfactants thus produced are effective to reduce the surface tension at the oil-water interface when flood-water is injected into the reservoir, the effectiveness of the surfactants produced by oxidation of the petroleum oil may be greatly enhanced by the addition of caustic to at least the initial portion of the flood-water.

Briefly, this invention teaches an oil-recovery process in which an oxygen-containing gas is first injected into the reservoir and the pressure of the injected gas is maintained over a period of time sufficient to permit the oxidation of a part of the oil in the reservoir. A caustic flood-water is then injected into the reservoir, and oil is produced therefrom.

It is an object of this invention to provide an improved method of recovery of petroleum oil from underground reservoirs.

Another object of this invention is to provide an improved secondary-recovery, water-flooding process for use in water-wet reservoirs.

It is another object of this invention to provide an improved water-flooding process in which surfactants are produced in situ in the reservoir by partial oxidation of the hydrocarbon oil therein.

In carrying out the process of this invention, an oxygen-containing gas is first injected into the oil-containing formation. Any gas containing free oxygen may be used, but air is preferred because it is cheap, abundant, and contains a suitable proportion of oxygen. The preferred injection pressures range between 100 p.s.i. and 500 p.s.i., although other pressures may be used where the circumstances require. In general, pressures below 100 p.s.i. are insufficient to maintain a rapid rate of oxidation in the reservoir. When lower pressures are used, it is necessary to soak the reservoir under pressure for an excessive period of time. On the other hand, pressures in the range of 400–500 p.s.i. produce a rapid rate of oxidation, so that a soak-period of 2 to 6 months is usually sufficient. Very high injection pressures should be avoided because the resulting rapid oxidation produces very high reservoir temperatures, and may result in the occurrence of spontaneous combustion and more or less complete oxidation and waste of the oil.

During the soak-period, the producing wells are preferably shut-in to maintain back-pressure on the formation. After the initial injection of a suitable quantity of air, the rate of injection may be reduced to the lowest rate sufficient to maintain the gas in the reservoir at about the initial injection pressure. It must be understood that the quantity of surfactants produced is proportional to the rate of oxidation of the oil and the length of the soak-period. The rate of oxidation is in turn dependent upon the pressure of the injected oxygen-containing gas, the temperature of the gas, and the percentage oxygen-content of the gas. High pressures, temperatures, and oxygen-content all tend to produce rapid oxidation rates. These three factors can be controlled to produce a rate of oxidation which permits a reasonably short soak-period without raising the reservoir temperature to a level at which complete combustion of the oil results. Uncontrolled combustion in the reservoir, resulting from too high a temperature, pressure, and oxygen-content, breaks down the hydrocarbon molecules and produces steam and carbon dioxide. The desired controlled oxidation, on the other hand, partially oxidizes the hydrocarbon molecules to produce organic acids, alcohols, ethers, aldehydes, ketones, etc. It is these organic compounds that exhibit surface-tension-depressing properties, especially in the presence of caustic.

When the injected oxygen-containing gas is air, satisfactory results are generally obtained if the air is injected at pressures between 100 and 500 p.s.i. and at the temperature at which the air is normally delivered to the injection well from the blowers. When very low injection pressures must be used, it is desirable to inject air which has been enriched with additional quantities of oxygen to maintain a satisfactory oxidation rate. When very high reservoir pressures are encountered, it may be necessary to inject the air at pressures so high that the oxidation will become uncontrolled. Under these circumstances, it is desirable to remove the quantity of the oxygen from the air before injection into the reservoir.

After the soak-period has ended, production is resumed at the producing well and an aqueous, caustic solution is injected through the injection wells. Ordinary water to which 1–5% by weight of sodium hydroxide has been added is very satisfactory, but other bases may also be used. It has been found that it is necessary to add caustic to only the initial portion of the flood-water. It is, therefore, preferred to inject about 0.1 reservoir pore volume of water to which 1–5% sodium hydroxide has been added, and drive the solution through the reservoir by the injection of ordinary water. In this way the amount of caustic required is greatly reduced. The injection of ordinary flood-water is continued until the oil-water ratio at the producing wells reaches an uneconomical level.

While the process of this invention is generally useful in treating any petroleum-containing reservoir, it is especially effective when applied to formations which are initially water-wet, that is, formations in which the rock is wetted by connate water, rather than by petroleum. It is well known that in such reservoirs the injected flood-water tends to displace the connate water and by-pass the petroleum. The surfactant materials produced by air-soaking such a reservoir convert the initially water-wet formation into one which is oil-wet, or intermediate between water-wet and oil-wet. Caustic floodwaters are especially effective in treating oil-wet reservoirs.

As a specific example of this invention, a partially depleted, water-wet, petroleum-containing reservoir having an internal pressure of 200 lbs. per square inch is treated by shutting in the producing wells and injecting air at a pressure of 400 lbs. per square inch for a period of two months. The reservoir is then permitted to soak for a period of one month, during which time additional air is injected only when the reservoir pressure drops to below 300 p.s.i. At the end of the soak-period, production of oil is resumed at the producing wells and 0.1 pore volume of a 2%-aqueous solution of sodium hydroxide is injected through the ar-injection wells. Ordinary flood-water is then injected until the oil-to-water ratio at the producing wells reaches an uneconomically high level.

Certain modifications of the process of this invention will be obvious to those skilled in the art. For example, the process of this invention may be modified, and perhaps improved, by the addition of surfactants or viscosity improvers to the aqueous, caustic solution. Whether or not the addition of such agents is desirable must be determined on the basis of an economic study of the individual reservoir under consideration. The process of this invention may be used with any of the normal water-flood patterns, such as the line-drive, the 5-spot, and the 9-spot patterns.

What is claimed is:

1. A method for producing oil from underground reservoirs penetrated by an input well and an output well comprising shutting in said output well, injecting an oxygen-containing gas through said input well and into said formation at an injection pressure in the range of 100–500 p.s.i and in the amount of at least 0.1 reservoir pore volume, then reducing the rate of injection of said gas to a rate sufficient to maintain the pressure of the injected gas within said range, maintaining said gas pressure for a period of at least two months to partially oxidize a portion of the oil in the reservoir, then injecting an aqueous solution of sodium hydroxide into the reservoir through said injection well to react with the partially oxidized oil portion, driving said solution through the reservoir by injecting flood water through said injection well, and opening said output well and producing oil therefrom.

2. A method according to claim 1 in which said gas is air and said pressure is maintained at 400–500 p.s.i. for a period of about two to six months.

3. A method according to claim 2 in which said aqueous solution contains sodium hydroxide in the amount of 1% to 5% by weight.

4. A method according to claim 3 in which the quantity of said solution is about 0.1 reservoir pore volume and water is injected into the reservoir to drive said solution therethrough.

References Cited in the file of this patent

UNITED STATES PATENTS

| | | |
|---|---|---|
| 1,238,355 | Squires | Aug. 28, 1917 |
| 1,651,311 | Atkinson | Nov. 29, 1927 |
| 1,787,972 | Doherty | Jan. 6, 1931 |
| 2,288,857 | Subkow | July 7, 1942 |

FOREIGN PATENTS

| | | |
|---|---|---|
| 696,524 | Great Britain | Sept. 2, 1953 |